Figure 1:
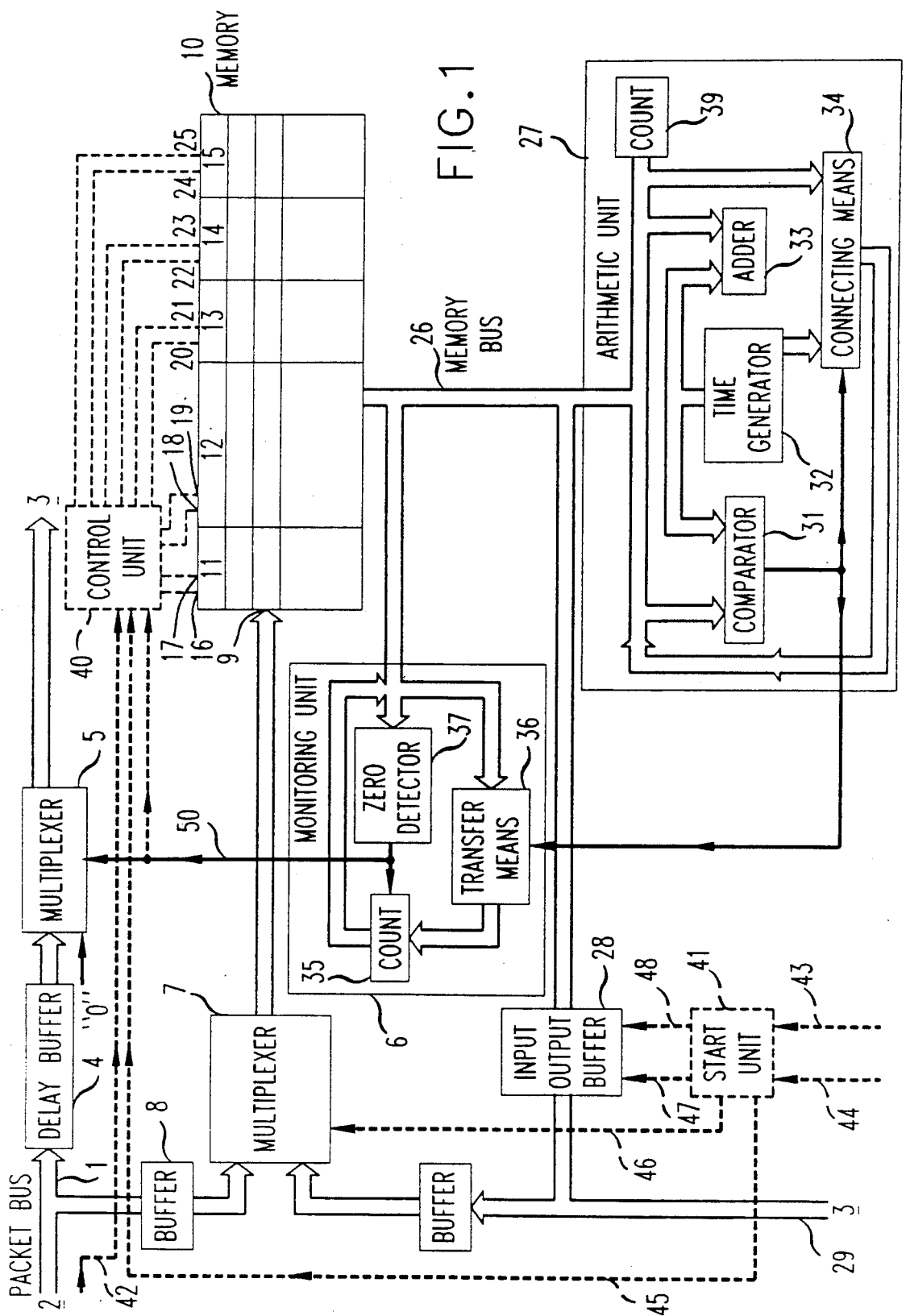

United States Patent [19]

Van Bavel et al.

[11] Patent Number: 5,050,163

[45] Date of Patent: Sep. 17, 1991

[54] METHOD OF ATD (ASYNCHRONOUS TIME DIVISION) SWITCHING OF DATA PACKETS AND AN ARRANGEMENT FOR IMPLEMENT THIS METHOD

[75] Inventors: Petrus J. M. Van Bavel; Gijsbertus G. Van Ooyen; Harmanus Van Tellingen, all of Hilversum, Netherlands

[73] Assignee: AT&T Bell Laboratories, Murray Hill, N.J.

[21] Appl. No.: 489,645

[22] Filed: Mar. 6, 1990

[30] Foreign Application Priority Data

Mar. 16, 1989 [NL] Netherlands .................. 8900640

[51] Int. Cl.⁵ .............................................. H04Q 11/04
[52] U.S. Cl. ........................................ 370/60; 370/94.1
[58] Field of Search .................. 370/94.1, 60, 60.1, 370/61, 58.1, 58.2, 58.3, 79, 80, 85.7, 95.1, 95.3; 340/825.06, 825.07, 825.52, 825.5, 825.51

[56] References Cited

U.S. PATENT DOCUMENTS

| | | | |
|---|---|---|---|
| 4,760,572 | 7/1988 | Tomikawa | 370/94.1 |
| 4,849,968 | 7/1989 | Turner | 370/94.1 |
| 4,864,495 | 9/1989 | Inaba | 370/94.1 |
| 4,922,438 | 5/1990 | Ballweg | 370/94.1 |
| 4,947,388 | 8/1990 | Kuwahara et al. | 370/60 |

Primary Examiner—Douglas W. Olms
Assistant Examiner—Alpus H. Hsu

[57] ABSTRACT

A method of ATD switching of data packets according to which various users are connected to a single subscriber line. By providing each data packet for each connection from a user to a receiver with a same identification code, specific information can be stored per user, such as the maximum number of packets transmitted within a time interval and the number of packets still authorized to be transmitted in a time interval. By implementing this method the switching of data packets can be monitored per user and per connection.

4 Claims, 4 Drawing Sheets

METHOD OF ATD (ASYNCHRONOUS TIME DIVISION) SWITCHING OF DATA PACKETS AND AN ARRANGEMENT FOR IMPLEMENT THIS METHOD

The invention relates to a method of ATD (Asynchronous Time Division) switching of data packets, according to which each packet is assigned a uniform identification code for each connection.

The invention further relates to an arrangement for implementing this method.

Such a method is known from "Digital Communications", "New Directions in Switching and Networks", Proceedings of the International Seminar, Zurich, Switzerland, Mar. 11-13, 1986, the article by J. S. Turner entitled "New Directions in Communications", pp. A 3.1-A 3.8, more specifically, page A 3.6.

In a packet-switched network users are connected to the network by means of subscriber lines. Since fast statistical variations in the number of packets to be processed may occur in a packet-switched network, measures are to be taken to maintain an acceptable chance of blocking under conditions of peak loading.

The above article by Turner describes a method of avoiding an overloading of the network by a single user when transmitting too many packets per given time interval. The user is then provided with an arrangement which blocks the switching of a packet to be transmitted by him if he offers too many packets during the time interval concerned. In order to carry out this monitoring function the arrangement constantly compares the number of packets transmitted by the user with a predetermined maximum number of packets. Once the number of transmitted packets exceeds this maximum number, the packet switching is blocked. After each time interval the stored number of transmitted packets is decremented by a predetermined value and the user may continue transmitting packets.

This method, the so-called "leaky bucket" method, monitors the number of transmitted packets of a single user connected to a subscriber line. When a plurality of users (for example, independently operating telephones, computers etc.) are connected to the same subscriber line, the number of packets each subscriber transmits over the subscriber line should also be monitored. From the above article by Turner no indications can be extracted for performing the monitoring function if there are more users per subscriber line.

It is an object of the invention to provide a method of monitoring for each user the number of packets to be transmitted by a plurality of users connected to a single subscriber line.

For this purpose the method according to the invention is characterized in that for each connection a time interval and a maximum number of packets to be transmitted within this time interval are chosen which time interval and which maximum number of packets to be transmitted within this time interval are stored per identification code at first and second memory locations respectively, for the duration of the connection, in that for each connection a predetermined time limit is stored at a third memory location, and in that a representation of a number of packets still authorized to be transmitted is stored at a fourth memory location, whilst a real-time count is compared with the time limit for each packet that is presented to be transmitted, and I. if the real-time count exceeds the time limit:

(a) the time limit at the third memory location is replaced by a new time limit which is determined by adding the time interval to the real-time count,
(b) the number of packets still authorized to be transmitted in the new time interval is replaced by the maximum number of packets to be transmitted, and
(c) the packet to be transmitted is switched; and II. if the real-time count falls short of the time limit: it is established whether the number of packets still authorized to to be transmitted in the relevant time interval exceeds the value "zero", in which case the number of packets still authorized to be transmitted is decremented by the value "one" and the packet to be transmitted is switched, and if the number of packets still authorized to be transmitted is equal to "zero", the switching of the packet to be transmitted is blocked.

Using the fact that each packet that is to be transmitted over a specific connection line from a user to a receiver comprises a same identification code, the number of packets transmitted in each time interval is additionally monitored for each identification code (and thus for each user). For this purpose, for each identification code a time interval is determined as well as a maximum number of packets to be transmitted in this time interval, whilst the interval and the maximum quantity are chosen by the user and affect the cost allocation, and a number of packets still authorized to be transmitted in the course of the current interval is defined. At the start of a new time interval (that is, upon the arrival of a first packet to be transmitted carrying the relevant identification code after a previous time interval), the number of packets still authorized to be transmitted is equated with the maximum number of packets and subsequently reduced by one unit with each packet to be transmitted carrying the same identification code. Once the number of packets authorized to be transmitted reaches the value "zero", the switching of subsequent packets carrying the same identification code is blocked until the time interval has passed and a new time interval begins.

The fact whether for each identification code the time interval has or has not elapsed is detected by adding, at the start of a new time interval, the value of the new time interval to the real-time count and thus constantly comparing with the real-time count the time limit obtained from this addition. Once the real-time count has exceeded the time limit, the time interval has elapsed and a new time limit can be established by means of the above addition.

Each connection from a user to a receiver has its own identification code. Each (data) packet which is to be transmitted over this connection is given this identification code. If a user again wants to have a connection with the same receiver some time after the connection has been terminated, this new connection will generally be identified by another identification code, although it is not entirely impossible that the same identification code happens to be issued for this next connection.

According to the "leaky bucket" method from the above article by Turner it is possible that if a user resumes transmission after a period of one or more time intervals without transmission, he is temporarily offered a larger transmission capacity than the predetermined one, because in the intervals during which he did not transmit, the stored number of transmitted packets was constantly decremented by a predetermined value.

This undesired disposal of a larger transmission capacity than was determined beforehand is impossible with the method according to the invention.

A preferred embodiment of the method according to the invention is characterized in that at each packet switching the total number of transmitted packets is stored per identification code at the fifth memory location.

For this purpose, the total number of packets transmitted over all time intervals elapsed till then is stored for each user and for each connection enabling thus a cost allocation, for example.

Figure 2A:
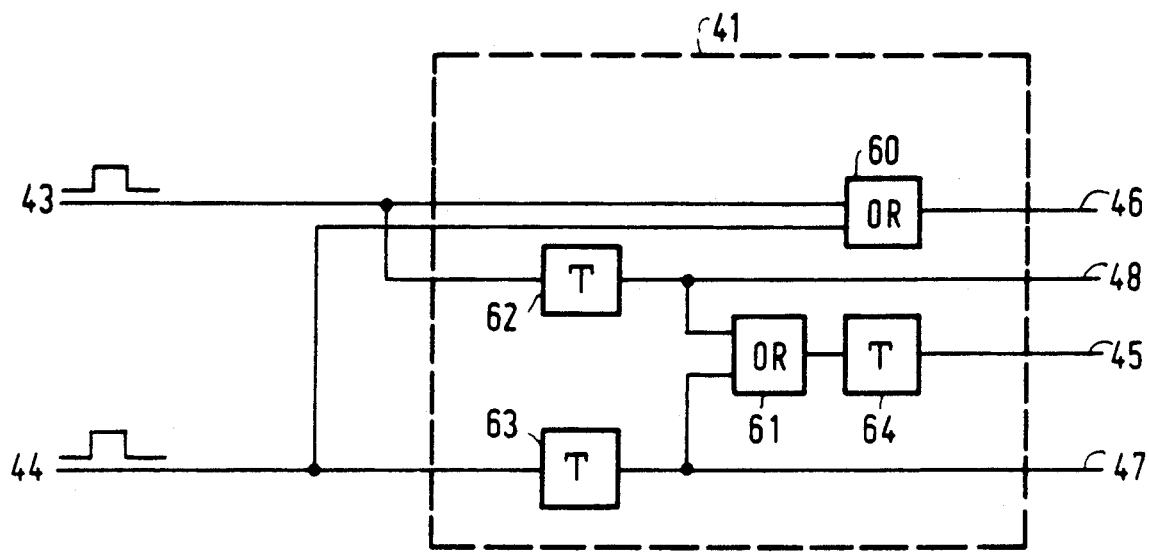
Figure 2B:
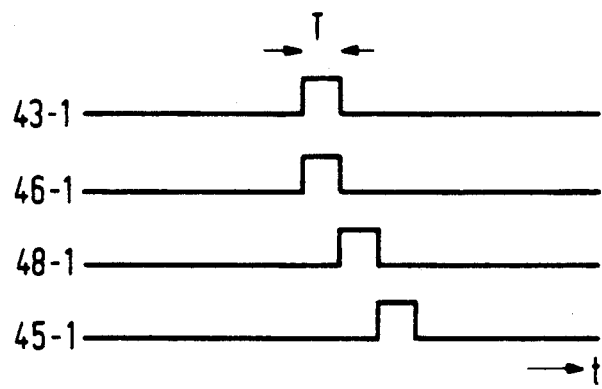
Figure 2C:
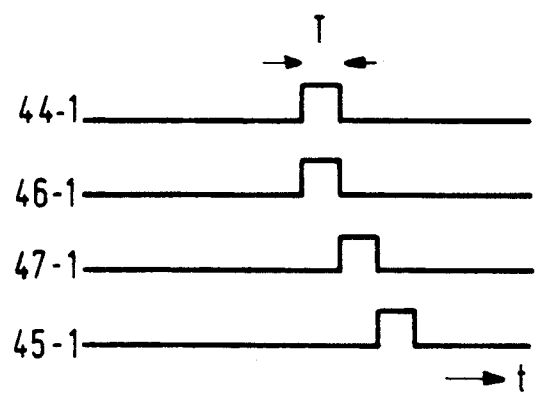
Figure 3:
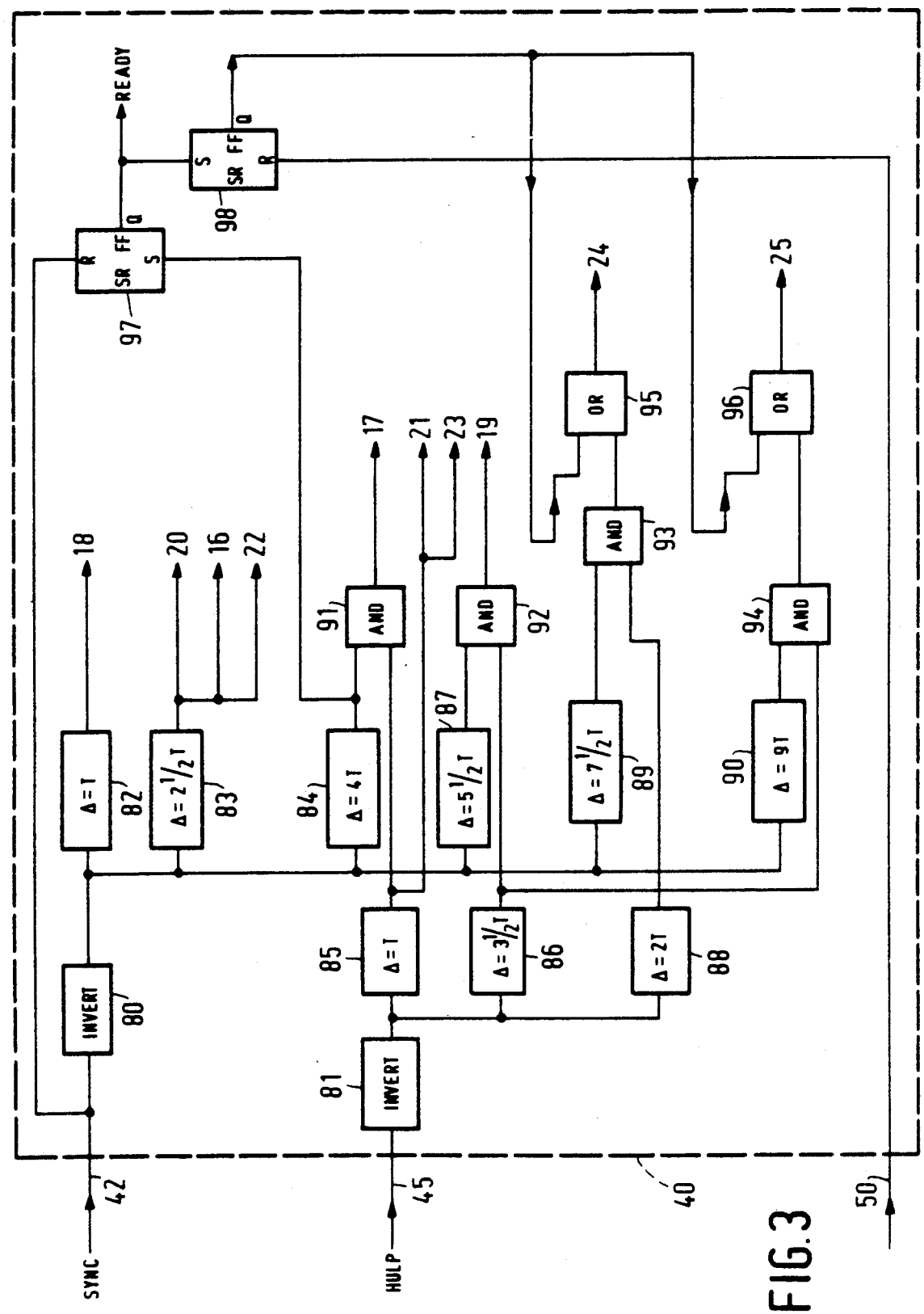
Figure 4:
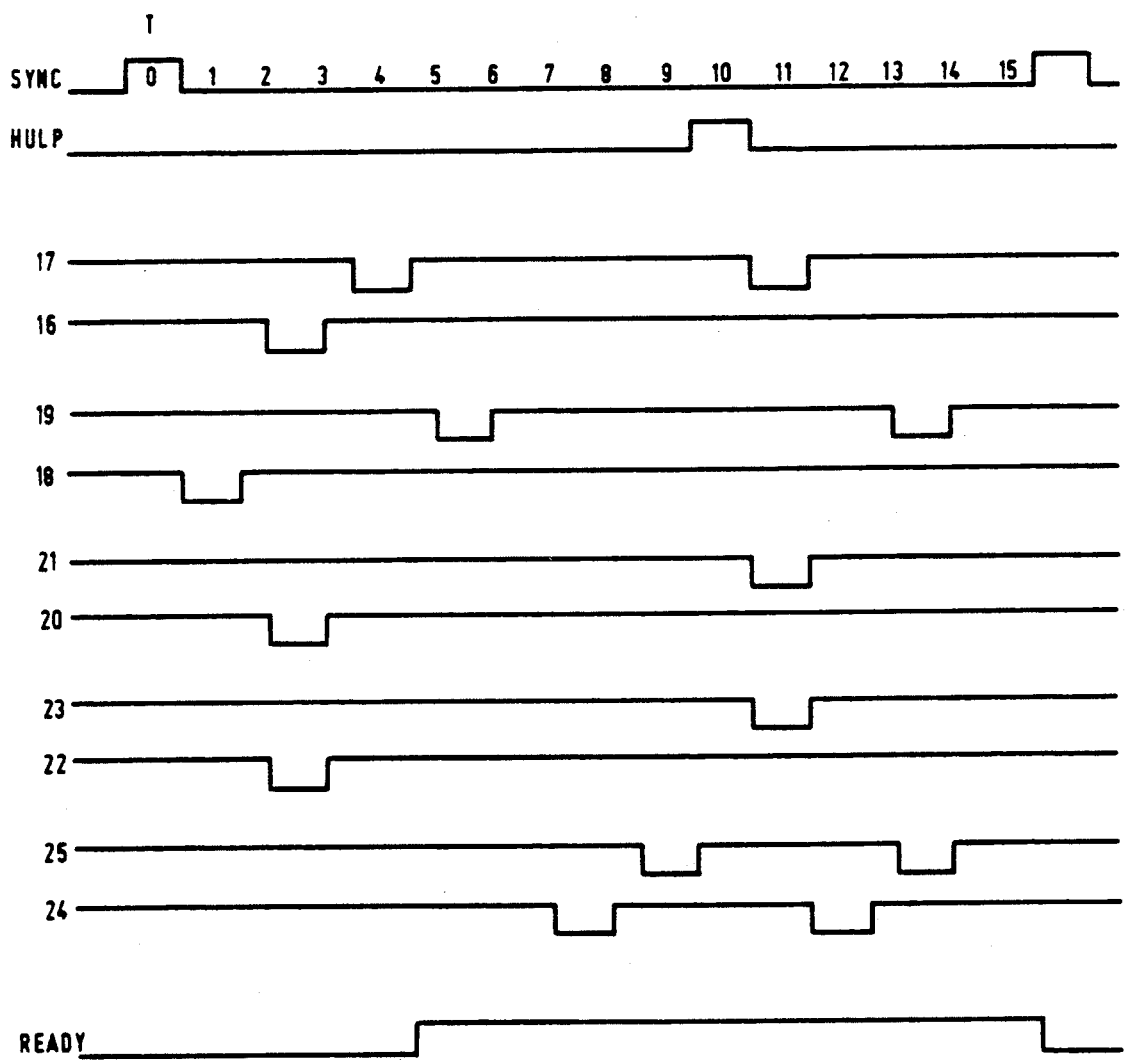

The invention will now be further explained with reference to the embodiment shown in the Figures, in which:

FIG. 1 shows a diagrammatic representation of the packet monitoring arrangement according to the invention, FIG. 2A shows a detailed diagram of the start unit according to the invention, FIG. 2B shows a time diagram in explanation of the start unit according to the invention, FIG. 2C shows a further time diagram in explanation of the start unit according to the invention, FIG. 3 shows a further explanation of the control unit according to the invention, FIG. 4 shows a time diagram in explanation of the control unit according to the invention.

The packet monitoring arrangement as shown in FIG. 1 comprises a packet bus 1 which is connected to users which are symbolically represented by 2. The packet bus 1 connects the users 2 to the network which is symbolically represented by 3 by means of a delay buffer 4 and an input and an output of a switching multiplexer 5 which functions as a blocking device. Delay buffer 4 is used for delaying the packets arriving from users 2 so as to allow time for the packet monitoring arrangement to compute whether a packet is to be switched or not to be switched.

Switching multiplexer 5 switches or does not switch this packet under the control of a signal originating from the output of the monitoring unit 6. Users 2 are further connected over packet bus 1 to an input of an address multiplexer 7 via a buffer 8. The output of the address multiplexer 7 is connected to an address input 9 of a memory 10. Memory 10 comprises five fields 11; 12; 13; 14; 15 which can be written or read out through two connections each 16, 17, 18, 19, 20, 21, 22, 23, 24, 25, the data being exchanged over a memory bus 26. Memory bus 26 is further connected to the monitoring unit 6, an arithmetic unit 27 and an input-output buffer 28. Monitoring unit 6 has a control input which is connected to the output of the arithmetic unit 27. Input-output buffer 28 is further connected to an external bus 29 which itself is further connected to the network 3 and the further input of address multiplexer 7 via a buffer 30.

The packet monitoring arrangement as shown in FIG. 1 further includes a control unit 40 generating the control signals via the connections 16-25 and a start unit 41. Control unit 40 is connected to a packet sync guide 42, start unit 41 and monitoring unit 6. Start unit 41 controls, in addition to control unit 40, also address multiplexer 7 and input-output buffer 28. The inputs of start unit 41 are connected to the external control guides 43 and 44 for receiving start signals originating from the network 3.

Arithmetic unit 27 comprises a comparator 31, a time generator 32, an adder 33, the connecting means 34 (to be called adding multiplexer 34 hereinafter) and an up-counter 39. One input of the comparator 31, adder 33 and adding multiplexer 34 respectively, is connected to memory bus 26. The other input of comparator 31 and adder 33 is connected to time generator 32. The output of adder 33 is connected to the other input of adding multiplexer 34, whose output is connected to memory bus 26. The output of comparator 31 is connected to the control input of adding multiplexer 34 and the output of arithmetic unit 27. The up-counter 39 in arithmetic unit 27 is also connected to memory bus 26.

Monitoring unit 6 comprises a down-counter 35, transfer means 36 and a zero detector 37. The inputs of zero detector 37 and transfer means 36 and the output of the down-counter 35 are connected to memory bus 26. The output of transfer means 36 is connected to the input of the down-counter 35. The output of zero detector 37 forms the output of the monitoring unit 6 and is connected to the control input of the down-counter 35. The control input of transfer means 36 forms the input to monitoring unit 6 which is connected to the output of arithmetic unit 27.

If a user 2 intends to transmit packets, he will first transmit a set-up packet. Such a set-up packet is featured by a fixedly chosen header comprising n bits, for example, fifteen bits having the logic value "zero" and one bit having the logic value "one". The set-up packet further includes information about the maximum number of packets to be transmitted during each specific time interval and about the destination.

The set-up packet coming from a user 2 enters the packet monitoring arrangement as shown in FIG. 1 over packet bus 1. At the same time a packet synchronizing signal arrives over packet sync guide 42 which signal is applied to control unit 40. The header of the set-up packet is stored in buffer 8. Address multiplexer 7 receives a signal from the start unit 41 so that the contents of buffer 8 (the header of the set-up packet) are applied to address input 9 of memory 10 via address multiplexer 7 in a manner to be described hereinafter.

Control unit 40 generates first a read signal through connection 18 (for reading the fields 11, 13 and 14 simultaneously) in response to the packet synchronizing signal (for reading field 12) and then simultaneous read signals through connections 16, 20 and 22. The contents of these fields are applied to arithmetic unit 27 and monitoring unit 6 over memory bus 26. In response to receiving these contents, arithmetic unit 27 applies a signal to monitoring unit 6 in response to which the latter applies a signal to switching multiplexer 5. The set-up packet, delayed in delay buffer 4 during the above procedure, is now transmitted to the network 3 via switching multiplexer 5 and packet bus 1.

The network 3 receives this set-up packet and derives therefrom the information of interest such as destination, packet rate (the maximum number of packets to be transmitted during each time interval) and the time interval. The network 3 generates a VCI (Virtual Circuit Identifier) belonging to the destination and transmits this VCI to the user who is to put this VCI in the headers of all data packets belonging to the same message which still have to be transmitted and thus have the same destination. All this has not been shown in FIG. 1 owing to the fact that it is of no importance to this invention.

The VCI generated by the network 3 is applied to address multiplexer 7 over external bus 29 and buffer 30. The maximum number of packets to be transmitted per time interval as well as the time interval concerned are applied to input-output buffer 28 over external bus 29. The network 3 simultaneously generates a start signal which is applied to start unit 41 over external control guide 43.

As a response, start unit 41 will generate three signals:

a first signal as a loading signal for input-output buffer 28, which, in response thereto, stores the data available on the external data bus 29 as the maximum number of packets to be transmitted per time interval;

a second signal as a selection signal for address multiplexer 7, which, in response thereto, applies the VCI from buffer 30 to address input 9 of memory 10; and a third signal as an auxiliary signal for control unit 40, which, in response thereto, applies control signals to memory 10 so as to load the fields 11, 13, 14 belonging to the address indicated by the VCI with data coming from the input-output buffer 28 and to load the further fields 12, 15 with the values "zero", over memory bus 26.

Subsequently, the user 2 receives a ready signal through a connection (not shown in FIG. 1) as a sign for him to start transmitting data packets whose headers comprise the VCI's generated by the network 3.

The transmitted data packet first enters the circuit over packet bus 1. The header comprising the VCI addresses the memory 10 via buffer 8 and address multiplexer 7. The packet synchronizing signal is applied to control unit 40 over packet sync guide 42. In response thereto control unit 40 first generates a read signal through connection 18 for reading field 12 which comprises the time limit. In the case of the first transmitted data packet this time limit is zero. The time limit is applied, over memory bus 26, to arithmetic unit 27 which compares the time with the real-time count of the time generator included in the arithmetic unit 27. Comparator 31 receives over memory bus 26 the contents of field 12 (the time limit) and compares the latter with the real-time count.

Subsequently, control unit 40 generates three read signals through the connections 16, 20 and 22 for reading field 11, comprising the number of packets still authorized to be transmitted in the relevant time interval, field 13, comprising the maximum number of packets to be transmitted per time interval, and field 14, comprising the time interval. Transfer means 36 receive, over memory bus 26, both the maximum number of packets and the number of packets still authorized to be transmitted. Depending on the signal at the control input, one of the two values is transferred with the aid of transfer means 36 and applied to the down-counter 35. In the case of the first transmitted data packet, these two values are equal and, because the time limit has the value "zero" and, consequently, falls short of the real-time count, the maximum number of packets to be transmitted is applied to the down-counter 35. The down-counter 35 decrements its count by the value "one" in response to a signal coming from the zero detector 37 which signal indicates that the number of packets applied to the zero detector 37 is unequal to the value "zero". Monitoring unit 6 applies this new value of the number of packets which is still authorized to be transmitted in the relevant time interval to memory bus 26. Switching multiplexer 5 receives from monitoring unit 6 the same signal of zero detector 37, in response to which switching multiplexer 5 switches through to the network 3 the data packet delayed in delay buffer 4.

The contents of the read field 14, being the time interval which is still valid, are simultaneously applied to up-counter 33 in arithmetic unit 27 over memory bus 26. In this unit the time interval is then added to the real-time count. Depending on the result of the comparison, either this sum or the original time limit will appear on memory bus 26 of arithmetic unit 27 because the adding multiplexer 34 optionally connects to either the output of up-counter 33 or memory bus 26 in response to the output signal of comparator 31 in a manner to be described hereinafter. In the case of the first transmitted data packet the time limit in field 12 is zero and is thus smaller than the real-time count, so the sum of the real-time count and the time interval from field 14 will appear on the memory bus 26 of arithmetic unit 27 as the new value for the time limit.

Subsequently, control unit 40 generates, through connection 17, a write signal for field 11 by means of which signal the new value of the number of packets still authorized to be transmitted is written into field 11 from monitoring unit 6. Then, control unit 40 generates, through connection 19, a write signal for field 12 by means of which signal the new value of the time limit is written into field 12 from arithmetic unit 27 over memory bus 26.

Finally, control unit 40 generates, through connection 24, a read signal for field 15 comprising the packet count, that is to say, the total number of packets that has been transmitted since the set-up packet. For the first data packet this is the packet count "zero". This value is applied, over memory bus 26, to the up-counter 39 in arithmetic unit 27, which up-counter 39 increments by one unit if switching multiplexer 5 has received from monitoring unit 6 the signal to pass the data packet. This new value of the packet count is then written into field 15 over memory bus 26 and, after a write signal from control unit 40, through connection 25.

From an arbitrary incoming data packet the header comprising the VCI is applied to address input 9 of memory 10 through buffer 8 and address multiplexer 7. This header addresses the five fields 11-15 with the following respective contents: the number of packets still authorized to be transmitted, the time limit, the maximum number of packets to be transmitted, the time interval and the packet count. Control unit 40 receives over packet sync guide 42 the packet synchronizing signal belonging to the data packet and, in response thereto, generates a read signal through connection 18 for reading the time limit from field 12. Over memory bus 26 the time limit is applied to comparator 31 in arithmetic unit 27 which comparator compares this time limit with the real-time count.

Thereafter, control unit 40 generates three read signals through the connections 16, 20 and 22 for reading the number of packets still authorized to be transmitted, the maximum number of packets to be transmitted and the time interval from the respective fields 11, 13 and 14. The number of packets still authorized to be transmitted as well as the maximum number of packets to be transmitted are applied to monitoring unit 6 over memory bus 26. The time interval is applied to arithmetic unit 27 over memory bus 26.

In arithmetic unit 27 a comparison is made between the time limit and the real-time count. If the time limit is smaller than the real-time count (the time interval has elapsed then) arithmetic unit 27 will apply a signal to monitoring unit 6 in response to which the down-counter 35 comprised therein is loaded with the maximum number of packets to be transmitted (at the beginning of a new time interval the maximum number of packets is again allowed to be transmitted). A down-counter 35 decrements its count by one unit and the new value obtained thus is written into field 11 owing to a write signal through connection 17. Switching multiplexer 5 receives a signal from monitoring unit 6 in response to which signal switching-multiplexer 5 switches the data packet. Arithmetic unit 27 simultaneously adds the real-time count to the time interval. This sum becomes the new time limit and appears on the memory bus 26. After field 11 has been written into, this new time limit is then written into field 12.

However, if the time limit exceeds the real-time count (the time interval has not yet elapsed then) the down-counter 35 is loaded with the number of packets from field 11. If this number is unequal to zero, the down-counter 35 decrements its count by one unit and this new value will be written into field 11. The data packet will then be switched. If the number of packets loaded as a count into down-counter 35 is already equal to the value "zero", the count of the second counter is not changed and this value "zero" will be written into field 11 and the data packet will be blocked. After field 11 has been written into, the previous time limit from arithmetic unit 27 is again written into field 12.

Subsequently, field 15 comprising the packet count is read and the packet count is applied to the up-counter 39 in arithmetic unit 27 over memory bus 26. If the data packet has been switched through, the up-counter 39 will increment its count by one unit and the new packet count obtained thus is again written into field 15 over memory bus 26.

If a user wishes to terminate the connection, he will send out a release packet. Such a release packet, just like a set-up packet, is featured by a fixedly chosen header comprising n bits, for example 15 bits having the logic value "zero" and one bit having the logic value "one". Consequently, a release packet is switched to the network 3 in the manner described above with respect to a set-up packet. The network 3 borrows from this release packet the information which is of interest, such as the sender (the user) and the VCI (destination).

The VCI obtained through the network 3 is applied to address multiplexer 7 over external bus 29 and buffer 30. At the same time, network 3 provides a start signal which is applied to start unit 41 over external control guide 44.

In response thereto start unit 41 will generate three signals:

a first selection signal for address multiplexer 7 which applies, in response thereto, the VCI from buffer 30 to address input 9 of memory 10;

an auxiliary signal for control unit 40 which generates, in response thereto, through the consecutive connections 17, 21 and 23, write signals for writing the values "zero" into the fields 11, 13 and 14, generates through connection 24 a read signal for reading field 15, and transfers the packet count to memory bus 26 (which packet count will then be loaded by input-output buffer 28), and generates through connections 19 and 25 write signals for writing the values "zero" into the fields 12 and 15, and a loading signal for input-output buffer 28 which is loaded, in response thereto, by data available on memory bus 26. The packet count loaded into input-output buffer 28 is then applied to the network 3 over the external bus 29. The user receives the message that his connection has been terminated and his total number of transmitted packets, the packet count, is stored by the network 3 in view of cost allocation.

The start unit 41 represented in FIG. 2A comprises an OR gate 60, three delay elements (time T) 62, 63 and 64 and an OR gate 61. OR gate 60 is connected to the external control guides 43 and 44. Its output applies the selecting signal to address multiplexer 7 over guide 46. Delay element 62 is connected to external control guide 43. Its output is connected to an input of OR gate 61 and applies a loading signal to input-output buffer 28 over guide 48. Delay element 63 is connected to external control guide 44. Its output is connected to the further input of OR gate 61 and applies a loading signal to input-output buffer 28 over guide 47. The output of OR gate 61 is connected to delay element 64 whose output applies an auxiliary signal to control unit 40 over guide 45.

A pulse over external control guide 43 appears on guide 46 through gate 60, and on guide 48 through delay element 62 after a time interval T, and on guide 45 through OR gate 61 and delay element 64 after a time interval 2T. A pulse on external control guide 44 appears on guide 46 through OR gate 60, and on guide 47 through delay element 63 after a time interval T, and on guide 45 through OR gate 61 and delay element 64 after a time interval 2T.

So, a pulse (43-1) over one of the two external control guides 42 and 44 over start unit 41 first causes a pulse (46-1) to appear at the control input of address multiplexer 7 over guide 46. Consequently, no longer the contents of buffer 8 but those of buffer 30 are transferred to address input 9 of memory 10, in other words, memory 10 is addressed with the VCI originating from a response packet over external bus 29. This is caused by a pulse at one control input of start unit 41, over guide 43, or at the other control input, over guide 44. In the former case input-output buffer 28 receives over guide 48 a pulse (48-1) delayed by T with respect to pulse 43-1, in response to which input-output buffer 28 loads data from external bus 29 and these data are transferred to the memory bus 26. In the latter case input-output buffer 28 receives a pulse (47-1) over guide 47 delayed by T relative to pulse 44-1, in response to which input-output buffer 28 loads data from data bus 26 and transfers these data to external bus 29. Subsequently, start unit 41 generates a pulse (45-1) delayed by 2T relative to pulse 43-1 or 11-1, which is applied as an auxiliary signal over guide 45 to control unit 40 which will be further described hereinafter.

FIGS. 3 and 4 show the control unit 40 and the relevant time diagram respectively.

Control unit 40 comprises an inverter 80 whose input is connected to packet sync guide 42. The output of inverter 80 is connected to the input of respective delay element 82 (delay T with T equal to the duration of a sync pulse on packet sync guide 42), delay element 83 (delay 2.5T), delay element 84 (delay 4T), delay element 87 (delay 5.5T), delay element 89 (delay 7.5T) and delay element 90 (delay 9T). The output of delay element 82 is coupled to connection 18. The output of delay element 83 is coupled to the connections 16, 20 and 22. The output of delay element 84 is coupled to an input of an AND gate 91, whose output is coupled to connection 17. The output of delay element 87 is coupled to an input of an AND gate 92, whose output is coupled to connection 19. The output of delay element 89 is connected to an input of an AND gate 93, whose output is coupled to an input of an OR gate 95, whose output is coupled to connection 24. The output of delay element 90 is coupled to an input of an AND gate 94, whose output is coupled to an input of an OR gate 96 whose output is coupled to connection 25.

The input of inverter 81 is coupled to connection 45 over which start unit 41 transmits the auxiliary signal. The output of inverter 81 is coupled to the inputs of time delay elements 85 (delay T), 86 (delay 3.5T) and 88 (delay 2T). The output of delay element 85 is coupled to the further input of AND gate 91 as well as connections 21 and 23. The output of delay element 86 is coupled to the further input of AND gate 92 and the further input of AND gate 94. The output of delay element 88 is coupled to the further input of AND gate 93.

Control unit 40 further includes two positive-edge-triggered SR flip-flops 97 and 98. The SET input of flip-flop 97 is coupled to the output of delay element 84 and the reset input is coupled to the packet sync guide 42. The output of flip-flop 97 is coupled to the SET input of 98 and the network 3 to which a ready signal is applied. The RESET input of flip-flop 98 is coupled to connection 50 through which zero detector 37 applies a signal to switching multiplexer 5 so as to transmit or not to transmit the data packet. The output of this flip-flop 98 is coupled to the further inputs of OR gates 95 and 96.

FIG. 4 shows the operation of control unit 40 in the form of a time diagram.

A positive pulse on packet sync guide 42, T in length, is inverted by the inverter 80 so that:

after time period T a negative pulse appears at connection 18 (the time limit is read out);

after time period 2.5T a negative pulse appears at connections 16, 20 and 22 (the number of packets authorized to be transmitted, the maximum number of packets and the time interval are read out);

after time period 4T a negative pulse appears at connection 17 (the number of packets authorized to be transmitted is written);

after time period 5.5T a negative pulse appears at connection 19 (the new time limit is written);

after time period 7.5T a negative pulse appears at connection 24 (the packet count is read out) if through connection 50 the zero detector 37 has supplied a signal in response to which switching multiplexer 5 switches through the data packet; and after time period 9T a negative pulse appears at connection 25 (the packet count incremented by one unit is written) if through connection 50 zero detector 37 has supplied a signal in response to which switching multiplexer 5 switches through the data packet.

A positive pulse as an auxiliary signal through connection 45, T in length, originating from start unit 41 is inverted by inverter 81 so that:

after time period T a negative pulse appears at the connections 17, 21 and 23 (the number of packets authorized to be transmitted, the maximum number of packets and the time interval are written from the input-output buffer 28);

after time period 2T a negative pulse appears at connection 24 (the packet count is read and loaded into input-output buffer 28 under the control of start unit 41) and after time period 3.5T a negative pulse appears at connection 19 (at the location of the time limit the value "zero" is written) and also at connection 25 (at the location of the packet count the value "zero" is written).

The above operations of reading of the packet count and writing of the packet count incremented by one unit in response to a pulse on the packet sync guide 42 are performed under the control of two flip-flops 97 and 98.

A pulse on packet sync guide 42 appears at the RESET input of flip-flop 97, causing its output Q to assume the logic value "zero". After a period of time 4T this pulse appears at the SET input and the output Q assumes the logic value "one". This is the "ready" signal intended for the network 3. This signal is also applied to the SET input of flip-flop 98 causing its output Q to assume the logic value "one". This output signal is applied to the two OR gates 95 and 96; their outputs also assume the logic value "one" and no negative pulses can appear at the connections 24 and 25. Consequently, the packet count can neither be read nor written. Only when zero detector 37 applies a signal (positive pulse) to switching multiplexer 5 through connection 50 (the packet switching may take place) will this positive pulse appear at the RESET input of flip-flop 98 and will the output Q assume the logic value "zero": the packet count can now be read or written by means of pulses through the connections 24 and 25.

We claim:

1. A method of ATD (Asynchronous Time Division) switching of data packets, according to which each packet is assigned a uniform identification code for each connection, characterized in that for each connection a time interval and a maximum number of packets to be transmitted within this time interval are chosen when time interval and which maximum number of packets to be transmitted within this time interval are stored per identification code at first and second memory locations respectively, for the duration of the connection, in that for each connection a predetermined time limit is stored at a third memory location, and in that a representation of a number of packets still authorized to be transmitted is stored at a fourth memory location, whilst a real-time count representative of the duration of each connection is obtained and is compared with the time limit for each packet that is presented to be transmitted, and I. if the real-time count exceeds the time limit:
   (a) the time limit at the third memory location is replaced by a new time limit which is determined by adding the time interval to the real-time count,
   (b) the number of packets still authorized to be transmitted in the new time interval is replaced by the maximum number of packets to be transmitted, and
   (c) the packet to be transmitted is switched; and II. if the real-time count falls short of the time limit: it is established whether the number of packets still authorized to be transmitted in the relevant time interval exceeds the value "zero", in which case the remaining number of packets still authorized to be transmitted is switched, and if the number of packets still authorized to be transmitted is decremented by the value "one" and the packet to be transmitted is switched, and if the number of packets still authorized to be transmitted is equal to "zero", the switching of the packet to be transmitted is blocked.

2. A method as claimed in claim 1, characterized in that with each packet switching the total number of packets transmitted is stored per identification code at a fifth memory location.

3. An arrangement for implementing Asyncronous Time Division (ATD) switching of data packets, the arrangement comprising:

means for receiving data packets;

at least first, second, third, and fourth memory locations, wherein the third memory location is loaded with a predetermined time limit for each of a plurality of connections;

means for storing a real time count and for periodically adding the contents of the first memory location thereto;

means for periodically comparing the real time count to the contents of the third memory location;

means responsive to the comparing means for periodically decrementing the contents of the fourth memory location; and a zero detector connected to the fourth memory location for blocking transmission of a packet if the contents of the fourth memory location is at most zero.

4. An arrangement as in claim 3 further comprising a fifth memory location for storing a number of packets which have been transmitted; and means for incrementing the contents of the fifth memory location each time a packet is transmitted.

* * * * *